United States Patent
Morton et al.

(10) Patent No.: US 10,520,264 B2
(45) Date of Patent: Dec. 31, 2019

(54) COOLING DEVICE FOR A VEHICLE BATTERY, VEHICLE BATTERY ASSEMBLY, AND METHOD FOR PRODUCING A COOLING DEVICE

(71) Applicant: Bayerische Motoren Werke Aktiengesellschaft, Munich (DE)

(72) Inventors: David Jakob Morton, Munich (DE); Stephan Weileder, Munich (DE); Micha Dirmeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1261 days.

(21) Appl. No.: 14/522,729

(22) Filed: Oct. 24, 2014

(65) Prior Publication Data

US 2015/0044540 A1    Feb. 12, 2015

Related U.S. Application Data

(63) Continuation of application No. PCT/EP2013/059929, filed on May 14, 2013.

(30) Foreign Application Priority Data

May 18, 2012   (DE) .......... 10 2012 009 889

(51) Int. Cl.
*H01M 10/625*    (2014.01)
*F28F 9/007*     (2006.01)
(Continued)

(52) U.S. Cl.
CPC .............. *F28F 9/007* (2013.01); *F28F 1/022* (2013.01); *H01M 2/1077* (2013.01);
(Continued)

(58) Field of Classification Search
CPC ........ F28F 1/022; F28F 2275/08; F28F 9/007; H01M 10/5016; H01M 10/613;
(Continued)

(56) References Cited

U.S. PATENT DOCUMENTS 6,858,344 B2    2/2005 Marukawa et al.
2002/0198464 A1   12/2002 Pinsonnault et al.
(Continued)

FOREIGN PATENT DOCUMENTS

CN        102057532 A     5/2011
DE    10 2008 059 966 A1  6/2010
(Continued)

OTHER PUBLICATIONS

Chinese-language Office Action issued in counterpart Chinese Application No. 201380017862.9 dated Dec. 24, 2015 with English translation (Nineteen (19) pages).

(Continued)

*Primary Examiner* — Lingwen R Zeng
(74) *Attorney, Agent, or Firm* — Crowell & Moring LLP

(57) ABSTRACT

A cooling device for an automotive battery includes at least one coolant line and at least one separate pressing element which is designed to be elastic so as to press the coolant line against an exterior side, preferably a flat side, of the automotive battery. The pressing element is designed as a composite component which has a separately manufactured reinforcing component which is enclosed in a plastic material. A method for manufacturing the cooling device includes the acts of providing a reinforcing component, in particular an elastic metal component, manufacturing an elastic pressing element as a composite component by sheathing the reinforcing component with plastic material, and applying a coolant line to the composite component. The composite component is acted upon to press against the coolant line in (Continued)

the event of deformation perpendicular to the exterior side of the automotive battery to be cooled.

15 Claims, 3 Drawing Sheets

(51) Int. Cl.
*H01M 2/10* (2006.01)
*H01M 10/6556* (2014.01)
*H01M 10/613* (2014.01)
*H01M 10/656* (2014.01)
*F28F 1/02* (2006.01)

(52) U.S. Cl.
CPC ....... *H01M 10/613* (2015.04); *H01M 10/625* (2015.04); *H01M 10/656* (2015.04); *H01M 10/6556* (2015.04); *F28F 2275/08* (2013.01); *H01M 2220/20* (2013.01); *Y10T 29/49359* (2015.01)

(58) Field of Classification Search
CPC ........... H01M 10/625; H01M 10/6556; H01M 10/656; H01M 2220/20; H01M 2/1077; Y10T 29/49359
See application file for complete search history.

(56) References Cited

U.S. PATENT DOCUMENTS

| | | | |
|---|---|---|---|
| 2008/0220324 A1* | 9/2008 | Phillips | B25F 5/02 429/120 |
| 2010/0198464 A1 | 8/2010 | Jones et al. | |
| 2011/0132580 A1 | 6/2011 | Herrmann et al. | |
| 2012/0301772 A1* | 11/2012 | Hirsch | H01M 10/0481 429/120 |
| 2013/0189558 A1 | 7/2013 | Haussmann | |

FOREIGN PATENT DOCUMENTS

| | | |
|---|---|---|
| DE | 10 2010 032 898 A1 | 2/2012 |
| DE | 10 2010 038 681 A1 | 2/2012 |
| EP | 2 599 153 B1 | 7/2014 |
| WO | WO 2012/013315 A1 | 2/2012 |
| WO | WO 2012/013582 A1 | 2/2012 |
| WO | WO 2012/013583 A1 | 2/2012 |

OTHER PUBLICATIONS

International Search Report dated Oct. 23, 2013 with English translation (seven (7) pages).

* cited by examiner

COOLING DEVICE FOR A VEHICLE BATTERY, VEHICLE BATTERY ASSEMBLY, AND METHOD FOR PRODUCING A COOLING DEVICE

CROSS REFERENCE TO RELATED APPLICATIONS

This application is a continuation of PCT International Application No. PCT/EP2013/059929, filed May 14, 2013, which claims priority under 35 U.S.C. § 119 from German Patent Application No. 10 2012 009 889.8, filed May 18, 2012, the entire disclosures of which are herein expressly incorporated by reference.

BACKGROUND AND SUMMARY OF THE INVENTION

The present invention relates to a cooling device for an automotive battery having at least one coolant line and at least one separate pressing element, which is designed with elasticity, to press the coolant line against an exterior side, preferably a flat side of the automotive battery. The present invention also relates to an automotive battery module having such a cooling device as well as a method for manufacturing such a cooling device.

A generic cooling device is known from US 2011/132580, for example. The pressing element is a tension frame made of metal, which is bolted to the coolant line and presses an electrical element of the automotive battery against the coolant line by means of a spring element. Such pressing elements have a high weight and require a complex mounting on the automotive battery, in particular in a case when a plurality of electrical elements must be used. Moreover, the metal tension frame may function as a heat bridge and thus reduce the effective cooling power of the cooling device in this way.

The object of the invention is to create a cooling device of a low weight and a pressing element, which has good and long-lasting elastic properties and can be manufactured easily and inexpensively.

This and other objects are achieved according to the invention by a cooling device for an automotive battery, comprising at least one coolant line and at least one separate pressing element, which is designed to be elastic, to press the coolant line against an exterior side, preferably a flat side of the automotive battery. The pressing element is designed as a composite component, which has a separately manufactured reinforcing component that is enclosed in plastic material. The weight of the cooling device and its manufacturing cost can be reduced due to the use of plastic material. On the one hand, the composite design with the reinforcing component permits improved mechanical properties, in particular with respect to stability, elasticity and long service life. Due to the design as a composite component with a reinforcing component manufactured separately, a long-lasting pressing element can be produced by simple manufacturing methods, for example, such as sheathing the reinforcing component. The plastic material of the pressing element makes it possible to design the pressing element with a low thermal conductivity in particular.

According to the preferred specific embodiment, the coolant line is in direct contact with the battery.

The plastic material enclosing the reinforcing component has a lower thermal conductivity than the reinforcing component in particular. This prevents unwanted transfer of heat with the cooling device.

A particularly long-lasting and compact reinforcing component can be implemented because the reinforcing component is made of metal.

For example, the metal reinforcing component may be sheet metal, which preferably has a curved shape in the relaxed state. Sheet metal can be manufactured easily in a variety of shapes by punching and shaping.

To achieve long-lasting elastic properties of the pressing element, the metal reinforcing component may be an elastic metal component, preferably made of spring steel or an elastic aluminum alloy.

It is possible that the pressing element has at least one elastic leg formed by the reinforcing components enclosed in the plastic material. Two elastic sections are preferably provided, each forming one leg of the pressing element.

A low structural height and good spring properties can be achieved by designing the elastic leg with a shallow angle to the cooled outside of the automotive battery. For example, the elastic leg may be positioned at an angle of less than 45°.

The elastic legs may have regions with a heterogeneous resistance torque to induce a more uniform deformation of the elastic section under load. Thus a local overloading of the elastic legs is prevented and the lifetime of the pressing element is extended.

To form regions with a different resistance moment, the reinforcing component may be designed heterogeneously, for example, with respect to its cross-sectional shape, and/or regions where the plastic sheathing is of a different thickness may be provided. This permits an equalization to develop between different load zones and preferably also permits a uniform deformation under load on the pressing element.

The pressing element may have at least one receptacle section, which receives the coolant line. The receptacle section permits positioning of the coolant line in particular as well as good pressing against the exterior side of the automotive battery that is to be cooled. The receptacle section may preferably permit mounting of the coolant line on the pressing element in a preassembled state.

The coolant line is preferably designed to be flat and to have a top side that is essentially complementary to the adjacent exterior side of the automotive battery, such that the cross section of the coolant line has a width that is preferably greater than its height. The largest possible area of direct contact between the coolant line and the exterior side of the automotive battery is provided in this way, so that no separate heat transfer element is needed between the coolant line and the automotive battery.

For example, between 35% and 70% of the cooled exterior side of the automotive battery may be contacted by coolant lines.

Improved insulation of the cooled exterior side of the battery may be implemented when at least one thermal insulation component, which is connected to the pressing element and forms insulation for the cooled exterior side of the battery, is provided.

An automotive battery module according to the invention comprises an automotive battery, which includes at least one battery element and the cooling device mentioned above, such that the cooling device is disposed between a flat side of the battery element that is to be cooled and a housing of the automotive battery, and the at least one coolant line is in direct contact with the flat side of the battery element that is to be cooled. This arrangement permits a compact design of the cooling device. Furthermore, the pressing element of the cooling device permits equalization of the tolerance between the housing of the automotive battery and the flat side of the battery elements to be cooled.

Simple positioning of the cooling device in the automotive battery module is made possible, in that the housing of the automotive battery has recesses and/or protrusions, which cause the cooling device, in particular the pressing elements, to be positioned relative to the housing.

A method according to the invention for manufacturing a cooling device for an automotive battery with an exterior side to be cooled comprises the process steps: providing a reinforcing component, in particular an elastic metal component; manufacturing an elastic pressing element as a composite component by sheathing the reinforcing component with a plastic material; and mounting a coolant line of the composite component, wherein the composite component is acted upon toward the coolant line in deformation at a right angle to the exterior side of the automotive battery that is to be cooled. The battery in particular has a planar exterior side to be cooled.

The reinforcing component may be punched from sheet metal and preferably shaped into a curved shape.

A simple and inexpensive manufacturing method is made possible by producing the composite part by extrusion, wherein the reinforcing component is sheathed with plastic material using an extrusion die.

To ensure good bonding of the plastic material to the reinforcing component, the reinforcing component may be coated with a primer layer prior to bonding to the plastic material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
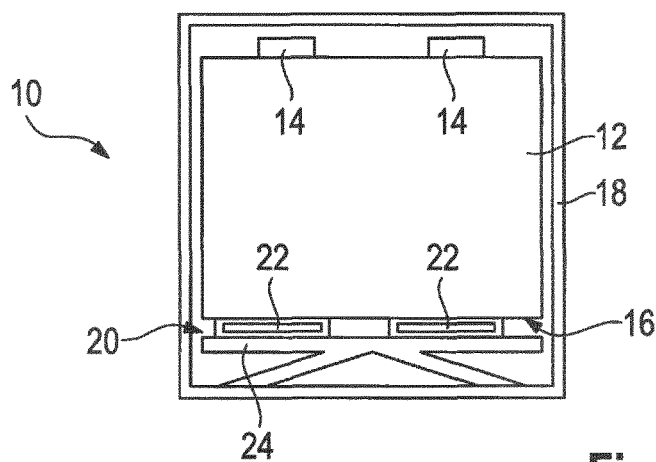
FIG. 1 is a schematic view of an automotive battery module according to the invention.

FIG. 1 shows a schematic view of an automotive battery module 10 with an automotive battery 12 comprising at least one battery element. Electric contacts 14 are provided on the top side of the battery elements. The flat bottom side of the battery elements forms an exterior side 16, which is to be cooled.

A housing 18 surrounds the automotive battery 12 and a cooling device 20, which cooling device is provided for cooling the flat exterior side 16 of the battery elements.

The cooling device 20 includes two coolant lines 22, which are designed to be flat and are in contact with the exterior side 16 of the battery elements on their flat sides. A separate pressing element 24 is provided to ensure a thermally conducting contact between the coolant lines 22 and the exterior side 16. The pressing element 24 is designed to be elastic and is supported on the bottom of the housing 18, where the pressing element 24 is prestressed in the installed state to press the coolant lines 22 against the exterior side 16 of the automotive battery 12.

The pressing element 24 is designed in particular so that manufacturing tolerances, which influence the distance between the exterior side 16 of the battery elements and the housing 18, can be compensated.

The cooling device 20 is designed to be flat, so that the installation space that is provided for the cooling device 20 between the exterior side 16 of the automotive battery and the housing 18 is between 1 cm and 5 cm, for example. Manufacturing tolerances of up to 10%, for example, can be compensated by the pressing element 24 of the cooling device 20.

Figure 2:
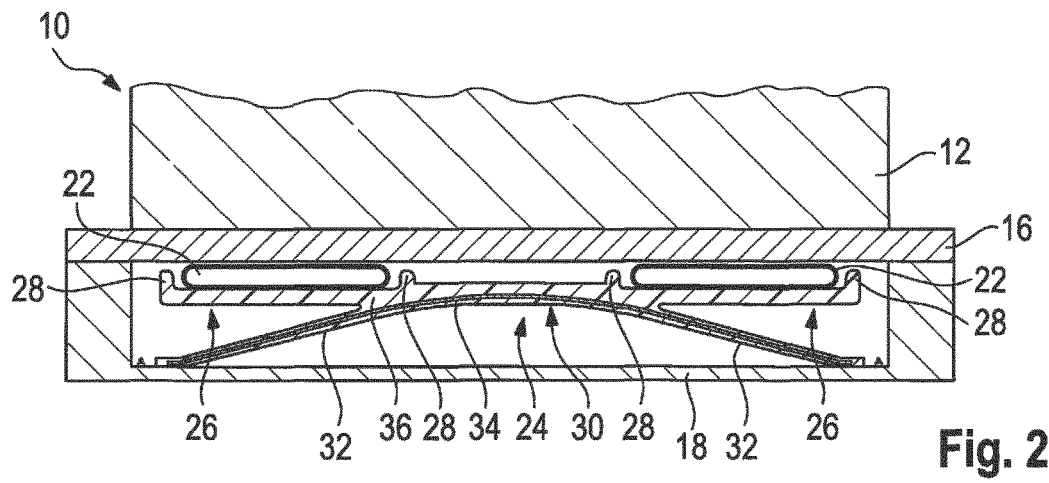
FIG. 2 is a detailed sectional view of a cooling device according to one specific embodiment of the invention.

FIG. 2 shows a first specific embodiment of an automotive battery module 10 with a detailed sectional view of the cooling device 20 according to a first specific embodiment.

The pressing element 24 has two receptacle sections 26, which receive the coolant lines 22. The receptacle sections 26 are designed to be essentially rigid and permit a good transfer of force to the coolant lines 22. In the first specific embodiment, the two receptacle sections 26 are connected by a central section 30 of the pressing element 24, this section being designed to be essentially rigid. The central section 30 and the two receptacle sections thus form a joint rigid section of the pressing element 24.

The receptacle sections 26 each have two positioning protrusions 28, which limit the lateral movement of the coolant lines 22 in relation to the pressing element 24. In this way, the pressing element 24 prevents a change in the distance between the coolant lines 22 in particular.

Two legs 32 designed to be elastic extend in the direction of the bottom of the housing 18, starting from the rigid receptacle sections 26, at a shallow angle to the plane of the cooled exterior side 16 of the automotive battery 12. The elastic legs 32 are situated with their ends on the housing 18 and are prestressed in the installed arrangement of the automotive battery module 10, so that the receptacle sections 26 of the pressing element 24 act upon the coolant lines 22 toward the exterior side 16 of the automotive battery 12 to be cooled.

The pressing element 24 is designed as a component part, which has a separately manufactured reinforcing component 34, which is enclosed in plastic material 36. In the first specific embodiment, the reinforcing component 34 is an elastic metal component, for example, made of spring steel or an elastic aluminum alloy, which permits a compact design of the elastic legs 32 of the pressing element 24 with good and long-lasting elastic properties.

The metal reinforcing component 34 is a metal plate, which has a curved shape in the relaxed state. In this way, both elastic legs 32 may be formed by a single reinforcing component 34.

It is also possible for a plurality of reinforcing components 34 to be provided, each of them being assigned to an elastic leg 32.

The plastic material 36 surrounding the reinforcing component 34 has a lower thermal conductivity than the reinforcing component 34. This minimizes the transfer of heat to the housing 18 by thermal conduction via the pressing element 24.

On the one hand, the plastic material 36 forms a thin coating on the reinforcing component 34 in the region of the elastic leg 32, thus permitting elastic deformation of the leg 32. On the other hand, the plastic material forms the essentially rigid receptacle sections 26 as well as the central section 30 of the pressing element 24 with a wall thickness of a corresponding thickness.

Figure 3:
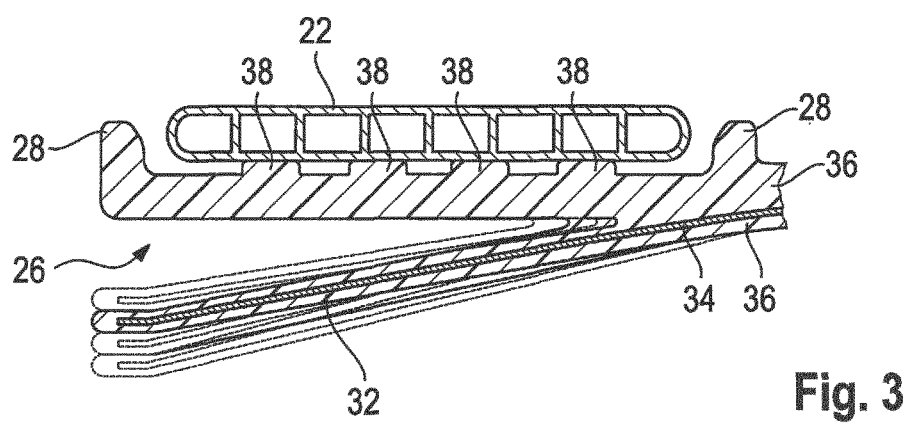
FIG. 3 is a detailed view of a cooling device according to FIG. 2.

FIG. 3 shows a detailed view of the left receptacle section 26 and of the left elastic leg 32 of the pressing element 24 from FIG. 2. The elastic leg 32 is shown in four positions with spring refraction of various extents.

Spacer ribs 38 having a height between 0.1 mm and 0.5 mm and a width between 0.5 mm and 2 mm, for example, are provided in the receptacle section 26. The clearance between neighboring spacer ribs 38 is between 0.5 mm and 2 mm. The spacer ribs 38 reduce the transfer of heat between the coolant line 22 and the pressing element 24 by reducing the contact area.

The coolant line 22 is designed to be flat, and the cross section of the coolant line 22 has a greater width than its height. In the specific embodiment shown here, the width of the coolant line 22 is more than nine times its height. Different cross sections of the coolant line 22 may also be provided, the cross section preferably having a width that is twice as large, preferably five times larger, and more preferably ten times larger than its height.

The coolant line 22 is divided by a plurality of supporting walls into numerous coolant ducts. The mechanical stability of the flat coolant line 22 is increased by the supporting walls. The coolant line 22 thus forms a board type of component, preferably having a plurality of coolant ducts.

To reduce the weight of the coolant device 20, it is advantageous if the wall thickness of the coolant line 22 is minimal and if the coolant line 22 is made of a lightweight material, for example, aluminum, e.g., by extrusion pressing.

The coolant line 22 may have a convex curvature upward in cross section in the unpressed state. In the installed state, the coolant line 22 is pressed flatly against the exterior side 16 of the automotive battery 12 by the pressing force of the pressing element 24.

Figure 4:
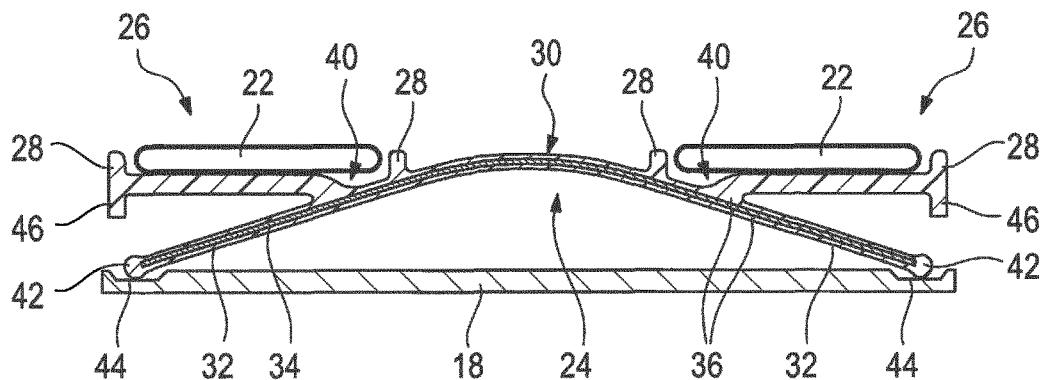
FIG. 4 is a sectional view of a cooling device according to a second specific embodiment of the invention.

FIG. 4 shows a second specific embodiment of the coolant device 20, wherein the pressing element 24 is designed to be rigid only in the region of the receptacle sections 26. The two legs 32 and the central section 30 between the two receptacle sections 26 are each designed to have spring elasticity.

A deformable connecting section 40 is provided between the rigid receptacle sections 26 and the leg 32, which is designed with spring elasticity, and/or the central section 30. The deformable connecting section 40 ensures that the receptacle sections 26 will retain their alignment in relation to the exterior surface 16 of the automotive battery 12, while the legs 32, which are designed with spring elasticity, and the central section 30 under elastic deformation. The deformable connecting section 40 is formed by an indentation on the top side of the pressing element 24 and by a tapering of the layer thickness of the plastic material 36 associated with the former.

On the ends of the elastic legs 32, the plastic material 36 forms a cambered protrusion 42 with which the pressing element 24 is in contact with the housing 18. Due to the cambered shape of the protrusion 42, the contact surface of the pressing element 24 on the housing 18 is minimized. This is advantageous for the friction between the pressing element 24 and the bottom of the housing 18 in deformation of the elastic legs 32 and to minimize the heat transfer between the pressing element 24 and the housing 18.

Furthermore, the ends of the elastic legs 32 are accommodated in recesses 44 in the housing bottom 18. The arrangement of the ends of the legs 32 in the recesses 44 in the housing 18 permits simple positioning of the cooling device 20 in relation to the housing 18. The recesses 44 are designed to be elongated to receive the ends of the legs 32 even with maximum elastic deformation in the recesses 44.

In the area of the receptacle sections 26, two protrusions forming a stop 46 are provided to limit deformation of the elastic legs 32, such that the stops 46 are in contact with the housing 18 or with the elastic legs 32 at the maximum deformation of the elastic legs 32.

Figure 5:
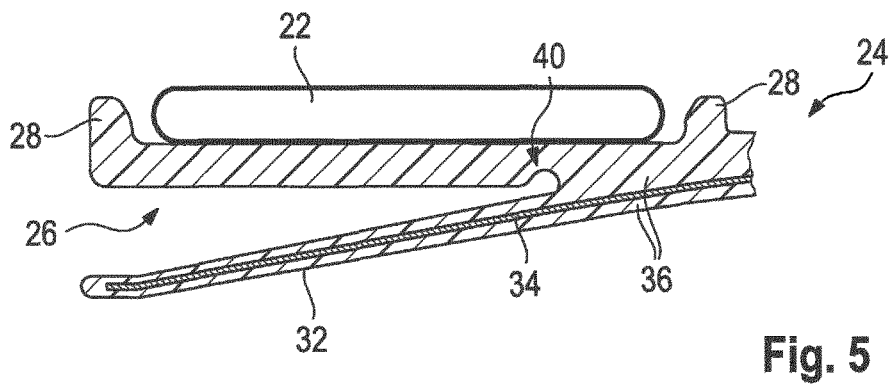
FIG. 5 is a detailed view of a cooling device according to the invention in an alternative embodiment.

FIG. 5 shows an embodiment of a pressing element 24, where a deformable connecting section 40 is formed by a recess on the bottom side of pressing element 24, and the tapering of the cross section allows elastic deformation of the connecting section 40.

Figure 6:
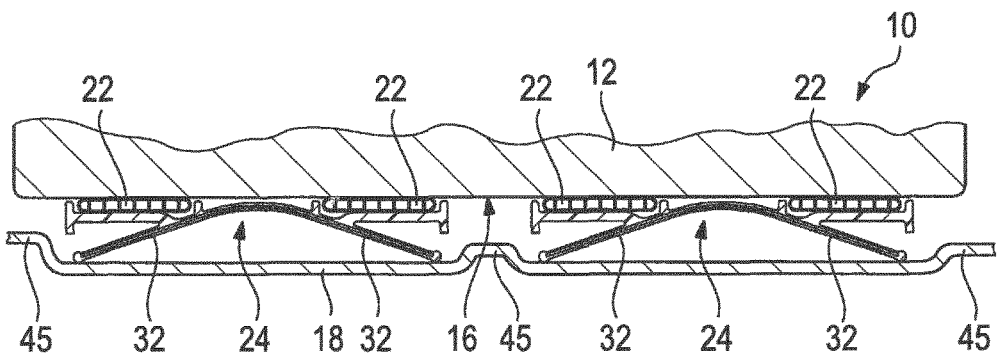
FIG. 6 is a sectional view of an automotive module according to the invention with two pressing elements according to FIG. 4.

FIG. 6 shows another specific embodiment of an automotive battery module 10, where two pressing elements 24 according to FIG. 4 are provided. Each pressing element presses two coolant lines 22 against the exterior side 16 of the automotive battery 12. For positioning the two pressing elements 24, corresponding protrusions 45 are provided on the housing 18, with the legs 32 of the pressing elements 24 being in contact with the housing 18 between the protrusions.

Figure 7:
FIG. 7 is a perspective view of a reinforcing component of a cooling device according to the invention.

FIG. 7 shows a three-dimensional perspective view of the reinforcing component 34. In the specific embodiment shown here, the reinforcing component is a metal plate, which is curved along one axis. The reinforcing component 34 is designed to be heterogeneous with regard to its cross-sectional shape in the axial direction. Recesses 47, which can be produced by punching, for example, are provided on the two side edges of the sheet metal.

The load on the elastic legs 32 of the pressing element 24 is the greatest in the connecting region of the rigid receptacle sections 26 and the elastic legs in particular. However, to permit the most uniform possible deformation of the elastic leg 32 and to prevent local overloading, the elastic leg 32 has regions with a heterogeneous resistance moment.

In the specific embodiment shown here, the regions having the heterogeneous resistance moment are formed by the recesses 47 in the reinforcing component 34. The recesses 47 are in particular triangular in shape with rounded tips.

As an alternative to the heterogeneous cross-sectional shape of the reinforcing component 34, regions are provided with plastic sheathing of different thickness, such that the resistance moment is increased in regions where the plastic sheathing is thicker.

Figure 8:
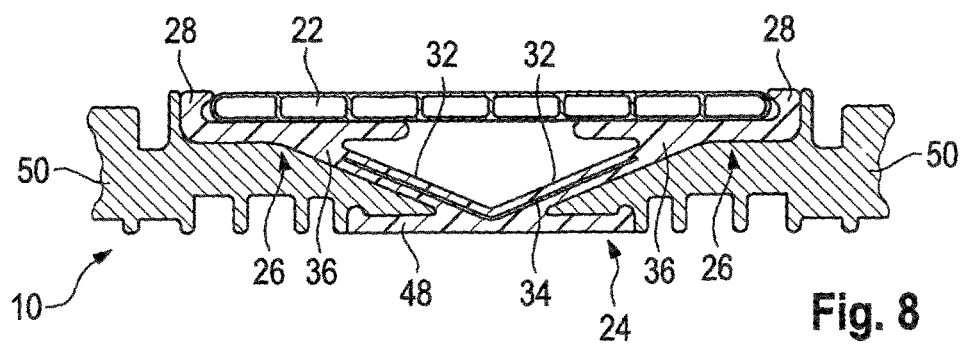
FIG. 8 is a sectional view of a cooling device according to a third specific embodiment of the invention in the relaxed state.
Figure 9:
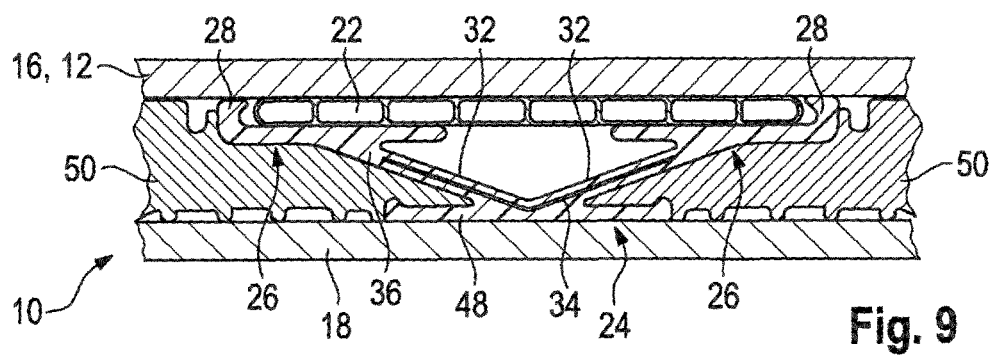
FIG. 9 is a sectional view of the cooling device according to FIG. 8 in a prestressed state.

FIGS. 8 and 9 show a third specific embodiment of a pressing element 24. The pressing element 24 has a planar bottom section 48, from which two elastic legs 32 extend obliquely upward to the coolant line 22. The pressing element 24 is in contact with the bottom side of the flat coolant line 22 at the ends of the legs 32, each having two receptacle sections 26 in the region of the opposite side edges, such that the coolant line 22 spans the legs 32 like a bridge.

Furthermore, the receptacle sections 26 each have a positioning protrusion 28 on their ends, reaching around the coolant line 22 on the side edge and thus forming a form-fitting connection between the pressing element 24 and the coolant line 22.

FIG. 8 shows a basic configuration of the pressing element 24, in which the pressing element 24 is not shown pressing the coolant line 22 against a flat exterior side of the battery 12. In this basic configuration, the pressing element 24 may be elastically relaxed or may have a prestress acting upon the positioning protrusions 28 of the pressing element 24, pressing them against the side walls of the coolant line 22.

Thermal insulation components 50 made of a deformable and/or compressible foam material are provided. The two thermal insulation components 50 are each connected in a form-fitting manner to the pressing element 24. A protrusion of the pressing element 24 in the region of the bottom section 48 engages in the thermal insulation component 50. In the specific embodiment shown here, the pressing element 24 is embedded in the thermal insulation component 50 in some sections.

To facilitate deformation of the thermal insulation component 50, deformation recesses are provided on the top side and on the bottom side of the thermal insulation component 50. The deformation recesses may also be used for a targeted change in the local deformation behavior of the thermal insulation component 50.

Coolant line 22, pressing element 24 and thermal insulation components 50 form an interconnected module, which represents a cooling bottom, whose total area preferably corresponds to the flat exterior side 16 of the automotive battery 12.

FIG. 9 shows the cooling device 20 from FIG. 8, where the cooling device 20 is installed in an automotive battery module 10 and is disposed between a battery element of the automotive battery 12 and the housing 18. The cooling device 20 is compressed in height, so that the legs 32 of the pressing element 24 are elastically compressed in a pressing configuration, and the coolant lines are pressed with their top sides against a flat side 16 of the battery element with a certain pressing force.

Likewise, the thermal insulation components 50 are also deformed, in particular in the region of the deformation recesses.

The pressing force, which acts on the coolant line 22, is determined on the one hand by the spring constant of the deformable legs 32 of the pressing element 24 and the elastic reinforcing component 34 embedded therein, as well as being determined by the compressibility of the material of the thermal insulation component 50, in particular in the region of the pressing element 24.

As shown in FIG. 9, the protrusions 28 of the legs 32 in the pressing configuration are no longer engaged with the side edges of the coolant line 22. In releasing the pressure on the pressing element, however, the legs 32 would recoil again and the positioning protrusions would again act on the side edges of the coolant line 22. This would ensure that the coolant line 22 is not fixedly connected to the pressing element 24 in the installed state of the coolant device.

Figure 10:
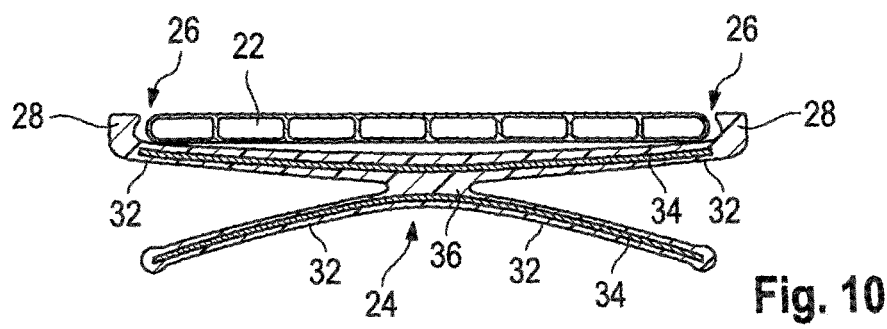
FIG. 10 is a sectional view of a cooling device according to a fourth specific embodiment of the invention with two reinforcing components.

FIG. 10 shows a fourth specific embodiment of a pressing element 24 having two reinforcing components 34. The two reinforcing components 34 are disposed in a stack in the direction perpendicular to the plane of the exterior side 16 of the automotive battery 12. The receptacle section 26 is formed by the two positioning protrusions 28, which can enclose the side walls of the coolant line 22 in a form-fitting manner. The upper reinforcing component 34 at the same time serves to mechanically reinforce the upper section of the pressing element 24 to form the receptacle section 26.

Various features of the different specific embodiments shown here may also be combined with one another advantageously.

A method for manufacturing a cooling device 20 for an automotive battery 12 is described below. In a first process step, a reinforcing component 34, in particular an elastic metal component is provided. To do so, the reinforcing component 34 is punched out of sheet metal and shaped into a curved shape. The finished reinforcing component 34 is shown in FIG. 7, for example.

Then the elastic pressing element 24 is produced with a plastic material 36 by sheathing the reinforcing component 34. The composite component is manufactured by extrusion, by sheathing the reinforcing component 34 with plastic material 36 using an extrusion die, in particular sheathing it completely.

In the case of a reinforcing component designed to be heterogeneous in the axial direction, such as that shown in FIG. 7, for example, the recesses 47 in the reinforcing component are filled with plastic material 36, so that the composite component has an essentially uniform exterior geometry in the axial direction.

To achieve good bonding of the reinforcing component 34 with the plastic material 36, the reinforcing component is coated with a primer before being fed into the extrusion die.

In conclusion, the coolant line 22 is attached to the composite component, such that the composite component is acted upon in deformation perpendicular to the plane of the exterior side of the automotive battery, pressing it against the coolant line.

To form the automotive battery module 10, the cooling device 20 is inserted into the housing 18 and then the battery elements of the automotive battery 12 are inserted. Since the cooling device 20 need not be attached permanently to the housing 18 or to the battery, a flexible assembly and dismantling are possible in a simple and flexible manner, for example, when replacing the cooling device 20 or the battery elements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for an automotive battery, comprising:
   at least one coolant line; and
   at least one separate elastic pressing element configured to press the coolant line against an exterior side of the automotive battery,
   wherein the elastic pressing element is a composite component comprising:
      a plastic sheathing made of a plastic material; and
      a separately manufactured reinforcing component enclosed by the plastic sheathing, and
   wherein the elastic pressing element comprises at least one elastic leg formed by the reinforcing component, both a top surface and a bottom surface opposite the top surface of the at least one elastic leg being at least partially coatedly enclosed by the plastic sheathing.

2. The cooling device according to claim 1, wherein the plastic material enclosing the reinforcing component has a lower thermal conductivity than that of the reinforcing component.

3. The cooling device according to claim 2, wherein the reinforcing component is made of metal.

4. The cooling device according to claim 3, wherein the reinforcing component is made of sheet metal and has a curved shape in a relaxed state.

5. The cooling device according to claim 3, wherein the reinforcing component is an elastic metal component made of spring steel or an elastic aluminum alloy.

6. The cooling device according to claim 1, wherein the elastic leg is configured to have a shallow angle relative to the exterior side of the automotive battery to be cooled.

7. The cooling device according to claim 6, wherein the elastic leg has regions with a heterogeneous resistance moment designed to induce a uniform deformation of the elastic leg under load.

8. The cooling device according to claim 7, wherein:
the reinforcing component is heterogeneous with regard to its cross-sectional shape, and/or
regions of differing thickness of the plastic sheathing are provided in the reinforcing component.

9. The cooling device according to claim 1, wherein the pressing element comprises at least one receptacle section accommodating the coolant line.

10. The cooling device according to claim 1, wherein:
the coolant line is configured to be flat such that a top side is essentially complementary to an adjacent exterior side of the automotive battery, and
a cross-section of the coolant line has a width greater than a height.

11. The cooling device according to claim 1, further comprising at least one thermal insulation component configured to connect the pressing element, the insulation component insulating the exterior side of the automotive battery to be cooled.

12. The cooling device according to claim 1, wherein the coolant line is pressed against the exterior side of the automotive battery over between 35% to 70% of the exterior side.

13. An automotive battery module, comprising:
an automotive battery having at least one battery element;
a cooling device for the automotive battery; and
a housing for the automotive battery,
wherein the cooling device is disposed between an exterior side of the battery elements to be cooled and the housing,
wherein the cooling device comprises:
at least one coolant line; and
at least one separate elastic pressing element configured to press the coolant line against an exterior side of the automotive battery,
wherein the elastic pressing element is a composite component comprising:
a plastic sheathing made of a plastic material; and
a separately manufactured reinforcing component enclosed by the plastic sheathing, and
wherein the elastic pressing element comprises at least one elastic leg formed by the reinforcing component, both a top surface and a bottom surface opposite the top surface of the at least one elastic leg being at least partially coatedly enclosed by the plastic sheathing.

14. The automotive battery module according to claim 13, wherein the housing comprises recesses and/or protrusions configured to position the cooling device in relation to the housing.

15. The cooling device according to claim 1, wherein the reinforcing component and the plastic sheathing are bonded to each other.

* * * * *